US010195596B2

United States Patent
Usui

(10) Patent No.: US 10,195,596 B2
(45) Date of Patent: Feb. 5, 2019

(54) ZEOLITE, METHOD FOR PRODUCING ZEOLITE, HONEYCOMB CATALYST USING ZEOLITE, AND EXHAUST GAS PURIFYING APPARATUS

(71) Applicant: IBIDEN CO., LTD., Ogaki-shi, Gifu (JP)

(72) Inventor: Toyohiro Usui, Gifu (JP)

(73) Assignee: Ibiden Co., Ltd., Gifu (JP)

( * ) Notice: Subject to any disclaimer, the term of this patent is extended or adjusted under 35 U.S.C. 154(b) by 0 days.

(21) Appl. No.: 15/573,261

(22) PCT Filed: May 13, 2016

(86) PCT No.: PCT/JP2016/064328
§ 371 (c)(1),
(2) Date: Nov. 10, 2017

(87) PCT Pub. No.: WO2016/182067
PCT Pub. Date: Nov. 17, 2016

(65) Prior Publication Data
US 2018/0111115 A1    Apr. 26, 2018

(30) Foreign Application Priority Data
May 13, 2015 (JP) .................. 2015-098376

(51) Int. Cl.
*B01J 29/76* (2006.01)
*B01J 37/30* (2006.01)
(Continued)

(52) U.S. Cl.
CPC ............ *B01J 29/763* (2013.01); *B01D 53/94* (2013.01); *B01D 53/9418* (2013.01);
(Continued)

(58) Field of Classification Search
CPC ....... C01B 39/06; C01B 39/145; C01B 39/48; B01D 53/94; F01N 3/2853; F01N 3/2828
(Continued)

(56) References Cited

U.S. PATENT DOCUMENTS 6,120,746 A * 9/2000 Takemoto .......... B01D 53/9418
  423/213.5
8,658,554 B2 * 2/2014 Dorner .................... B01J 23/10
  423/230
(Continued)

FOREIGN PATENT DOCUMENTS

JP    2007-296521 A    11/2007
JP    2011-521871 A    7/2011
(Continued)

OTHER PUBLICATIONS

PCT/ISA/210 from PCT/JP2016/064328 with the English translation thereof.
PCT/ISA/237 from PCT/JP2016/064328.

*Primary Examiner* — Tom P Duong
(74) *Attorney, Agent, or Firm* — Carrier Blackman & Associates, P.C.; Joseph P. Carrier; Anne G. Sabourin

(57) ABSTRACT

There is provided a zeolite which has excellent NOx purifying performance, particularly excellent NOx purifying performance after heat endurance. The zeolite has a CHA structure in which Cu and Ce are carried, and has a Cu/Al molar ratio of 0.25 to 0.48 and a Ce/Al molar ratio of 0.01 to 0.03.

9 Claims, 7 Drawing Sheets

(51) Int. Cl.
  *B01D 53/94* (2006.01)
  *C01B 39/48* (2006.01)
  *F01N 3/10* (2006.01)
  *B01J 35/02* (2006.01)
  *B01J 35/04* (2006.01)
  *B01J 37/00* (2006.01)
  *F01N 3/28* (2006.01)
  *C01B 39/06* (2006.01)
  *C01B 39/14* (2006.01)
  *F01N 3/20* (2006.01)

(52) U.S. Cl.
  CPC ............ *B01J 29/76* (2013.01); *B01J 35/026* (2013.01); *B01J 35/04* (2013.01); *B01J 37/0018* (2013.01); *B01J 37/30* (2013.01); *C01B 39/06* (2013.01); *C01B 39/145* (2013.01); *C01B 39/48* (2013.01); *F01N 3/10* (2013.01); *F01N 3/2828* (2013.01); *F01N 3/2853* (2013.01); *B01D 2255/2065* (2013.01); *B01D 2255/20761* (2013.01); *B01D 2255/50* (2013.01); *C01P 2002/74* (2013.01); *C01P 2004/62* (2013.01); *F01N 3/2066* (2013.01); *F01N 3/281* (2013.01); *F01N 2330/06* (2013.01); *F01N 2370/04* (2013.01); *F01N 2510/063* (2013.01)

(58) Field of Classification Search
  USPC .................. 422/177, 180; 423/700
  See application file for complete search history.

(56) References Cited

U.S. PATENT DOCUMENTS

| | | | |
|---|---|---|---|
| 2003/0134743 A1* | 7/2003 | Sumida | B01D 53/9481 502/304 |
| 2005/0123465 A1* | 6/2005 | Chane-Ching | B01J 23/10 423/349 |
| 2007/0259770 A1 | 11/2007 | Hofmann et al. | |
| 2009/0084090 A1* | 4/2009 | Nakatsuji | B01D 53/9422 60/299 |
| 2011/0020204 A1 | 1/2011 | Bull et al. | |
| 2011/0076229 A1 | 3/2011 | Trukhan et al. | |
| 2012/0201731 A1 | 8/2012 | Ballinger et al. | |
| 2013/0052125 A1 | 2/2013 | Moini et al. | |
| 2013/0142727 A1 | 6/2013 | Li et al. | |
| 2013/0280160 A1 | 10/2013 | Ariga et al. | |
| 2014/0037523 A1 | 2/2014 | Ballinger et al. | |
| 2014/0234206 A1 | 8/2014 | Trukhan et al. | |
| 2014/0328738 A1 | 11/2014 | Chandler | |
| 2015/0064074 A1 | 3/2015 | Ballinger et al. | |
| 2015/0343375 A1 | 12/2015 | Moini et al. | |
| 2016/0008759 A1* | 1/2016 | Sonntag | B01J 35/0006 423/239.1 |

FOREIGN PATENT DOCUMENTS

| | | |
|---|---|---|
| JP | 2012-508096 A | 4/2012 |
| JP | 2012-211066 A | 11/2012 |
| JP | 2014-527017 A | 10/2014 |
| JP | 2015-500138 A | 1/2015 |
| JP | 2015-502909 A | 1/2015 |

\* cited by examiner

ZEOLITE, METHOD FOR PRODUCING ZEOLITE, HONEYCOMB CATALYST USING ZEOLITE, AND EXHAUST GAS PURIFYING APPARATUS

TECHNICAL FIELD

The present invention relates to zeolite, a method for producing the zeolite, a honeycomb catalyst using the zeolite, and an exhaust gas purifying apparatus.

BACKGROUND ART

In the related art, as one of systems which purify exhaust gas of an automobile, there has been known a selective catalytic reduction (SCR) system that reduces NOx to nitrogen and water using ammonia, and zeolite having a copper-carried CHA structure is paid attention as zeolite achieving SCR catalysis.

In this SCR system, a honeycomb unit, in which a large number of through holes allowing the exhaust gas to pass therethrough are arranged in parallel to extend in a longitudinal direction, is used as an SCR catalyst carrier. For example, as one that aims to enhance heat resistance and endurance in a case of being used as an SCR catalyst carrier, zeolite having a CHA structure is disclosed in Patent Literature 1 in which a composition ratio of $SiO_2/Al_2O_3$ is less than 15 and a particle size is 1.0 to 8.0 μm.

On the other hand, zeolite having a CHA structure is disclosed in Patent Literature 2 in which a composition ratio of $SiO_2/Al_2O_3$ is less than 15 and the content of alkali is less than 3% by mass. In this case, however, the surface of a honeycomb unit substrate made of another substance needs to be coated with the CHA-structured zeolite to obtain an effect as an SCR catalyst.

A technique is disclosed in Patent Literature 3 in which zeolite is extrusion-molded together with an inorganic binder and the like into a honeycomb shape in producing of a honeycomb unit to be used as an SCR catalyst.

A catalyst composition is disclosed in Patent Literature 4 in which a molar ratio (SAR) of silica to alumina is about 10 to about 30, the content of an exchange nonaluminum transition metal (for example, copper (Cu)) is about 1.5 to about 5 wt % with respect to the total weight of zeolite, and the content of cerium (Ce) is about 1.35 wt % or more.

CITATION LIST

Patent Literature

[Patent Literature 1]: JP-A-2012-211066
[Patent Literature 2]: JP-T-2012-508096
[Patent Literature 3]: JP-A-2007-296521
[Patent Literature 4]: JP-T-2015-500138

SUMMARY OF THE INVENTION

Technical Problem

However, the above-described conventional techniques have the following problems.

That is, as disclosed in Patent Literature 1, the zeolite having the CHA structure (hereinafter, also referred to as CHA-type zeolite), in which the particle size is 1.0 to 8.0 μm, has low heat resistance for use as an SCR for purifying automobile exhaust gas, and thus there is a problem that the NOx purification rate is low after a thermal load is applied.

Since the zeolite disclosed in Patent Literature 2 exhibits the function as a catalyst by coating of the surface of the honeycomb unit substrate, there is a problem that the zeolite density is low as a catalyst, resulting in a low NOx purification rate.

In the zeolite disclosed in Patent Literature 4, the amount of Ce to be carried is large, and thus oxidation of ammonia serving as a reducing agent proceeds when used as an SCR catalyst, resulting in causing problems that NOx generated by the lack of the reducing agent or ammonia oxidation is not treated and the NOx purification rate is lowered.

The present invention has been made to solve the above problems and an object thereof is to provide zeolite that is excellent in NOx purifying performance and particularly is excellent in NOx purifying performance after heat endurance, a honeycomb catalyst using the zeolite, and an exhaust gas purifying apparatus.

Solution to Problem

That is, the present invention is to provide zeolite having a CHA structure in which Cu and Ce are carried, wherein a Cu/Al molar ratio is 0.25 to 0.48 and a Ce/Al molar ratio is 0.01 to 0.03.

From extensive studies on zeolite on which Cu and Ce are carried, the inventors have found in the zeolite having the CHA structure that heat resistance is improved (suppression of structural fracture of zeolite due to heat) when the Ce/Al molar ratio is set to 0.01 or more and the oxidation of ammonia acting as a reducing agent can be suppressed when the Ce/Al molar ratio is set to 0.03 or less. In addition, the inventors have found that the amount of Cu to be carried can be increased when the Cu/Al molar ratio is set to 0.25 or more and Cu can be prevented from being present as CuO without being ion-exchanged when the Cu/Al molar ratio is set to 0.48 or less. The presence of CuO in the zeolite or the surface thereof causes oxidation of ammonia acting as the reducing agent to proceed. Thereby, it is possible to provide zeolite that is excellent in NOx purifying performance and particularly is excellent in NOx purifying performance after heat endurance.

In the zeolite of the present invention, a $SiO_2/Al_2O_3$ composition ratio (SAR) is preferably less than 15. When the composition ratio of the $SiO_2/Al_2O_3$ is less than 15, the purification rate of NOx after the heat endurance can be further enhanced. The reason is that, when the $SiO_2/Al_2O_3$ is less than 15, the amount of alumina increases and the amount of carried Cu serving as a catalyst can be increased proportionately.

In the zeolite of the present invention, the zeolite has preferably an average particle size of 0.5 μm or less.

Since the zeolite having the average particle size of 0.5 μm or less and a small particle size is used, when the zeolite is used for a honeycomb catalyst, the amount of water absorption displacement, cracks hardly occurs at the time of production or use as a catalyst, and endurance is superior. On the other hand, when the average particle size exceeds 0.5 μm, when the zeolite is used for the honeycomb catalyst, the amount of water absorption displacement may become large and cracks may occur in the honeycomb catalyst.

In the zeolite of the present invention, the zeolite having the CHA structure has preferably a total integrated intensity of a (211) plane, a (104) plane, and a (220) plane in an X-ray diffraction spectrum obtained by an X-ray powder diffraction method being 55000 or more. The crystallinity is excellent as the integrated intensity becomes higher, and it is possible to obtain high NOx purifying performance when the total integrated intensity is 55000 or more.

The present invention is to provide a method for producing the zeolite including: synthesizing the zeolite by reacting a raw material composition containing a Si source, an Al source, an alkali source, water, and a structure directing agent. Preferably, the Al source is dried aluminum hydroxide gel.

According to the method of the present invention, since the solubility in an alkali solution is high, it is possible to reduce variations in the particle size and the $SiO_2/Al_2O_3$ molar ratio of the synthesized zeolite.

In the method for producing the zeolite of the present invention, a molar ratio ($SiO_2/Al_2O_3$) of the Si source and the Al source contained in the raw material composition is preferably 10 to 15. When the $SiO_2/Al_2O_3$ is within the above range, the zeolite having SAR of less than 15 is easily obtained.

The present invention is to provide a honeycomb catalyst including a honeycomb unit having a plurality of through holes extending in parallel in a longitudinal direction and separated from one another by partition walls, wherein the honeycomb unit contains zeolite and an inorganic binder, and the zeolite is the zeolite according to present invention.

In the honeycomb catalyst of the present invention, since the zeolite of the present invention is used, it is possible to obtain t honeycomb catalyst including the honeycomb unit having the high NOx purification rate.

Further, the present invention is to provide an exhaust gas purifying apparatus including: a holding sealing material arranged on an outer peripheral portion of the honeycomb catalyst of the present invention; and a metallic container into which the holding sealing material is canned.

According to the exhaust gas purifying apparatus of the present invention, it is possible to provide the exhaust gas purifying apparatus which is excellent in NOx purifying performance and particularly is excellent in excellent in NOx purifying performance after heat endurance.

Advantageous Effects of the Invention

As described above, according to the present invention, it is possible to provide zeolite that is excellent in NOx purifying performance and particularly is excellent in NOx purifying performance after heat endurance, a honeycomb catalyst using the zeolite, and an exhaust gas purifying apparatus.

DESCRIPTION OF EMBODIMENTS

Figure 1:
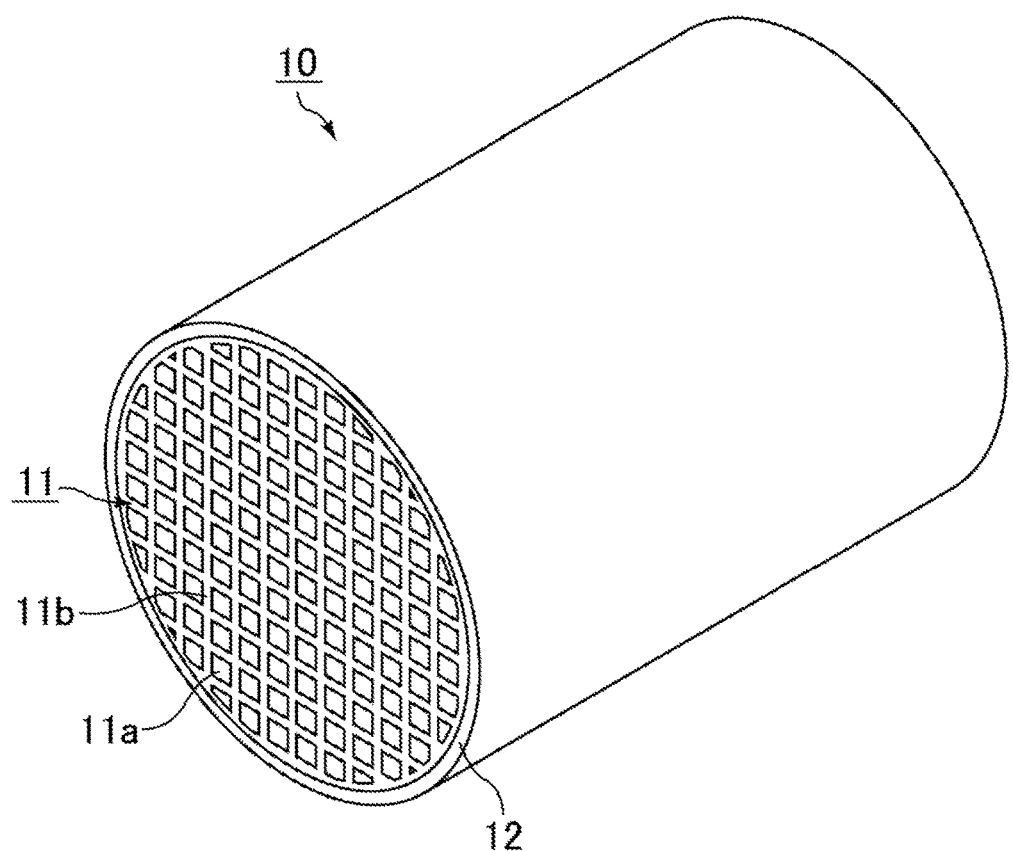
FIG. 1 is a perspective view schematically illustrating an example of a honeycomb catalyst according to the present invention.

The present invention will be described below in detail. However, the present invention is not limited to the following description, but can be appropriately modified and applied within the scope and spirit of the present invention.

In the description, the term "mass" means "weight".

<Zeolite>

In zeolite of the invention, the zeolite is characterized by having a CHA structure in which Cu and Ce are carried, a Cu/Al molar ratio of 0.25 to 0.48, and a Ce/Al molar ratio of 0.01 to 0.03.

The zeolite of the invention is named and classified with the structure code of CHA by the International Zeolite Association (IZA), and has a crystal structure equivalent to chabazite which is naturally produced.

The crystal structure of the zeolite is analyzed using an X-ray diffraction (XRD) apparatus. In an X-ray diffraction spectrum of the CHA-type zeolite by an X-ray powder analysis method, peaks corresponding to the (211) plane, (104) plane, and (220) plane of a CHA-type zeolite crystal appear respectively at $2\theta$=around 20.7°, around 25.1°, and around 26.1°.

Next, XRD measurement is performed with an X-ray diffractometer (Ultima IV, manufactured by Rigaku Corporation). Measurement conditions are as follows:
radiation source: CuKα ($\lambda$=0.154 nm),
measurement method: FT method,
diffraction angle: $2\theta$=5 to 48°,
step width: 0.02°,
integration time: 1 second,
divergence slit and scattering slit: 2/3°,
vertical divergence limiting slit: 10 mm,
acceleration voltage: 40 kV, and
acceleration current: 40 mA.

The weight of the sample is set not to change 0.1% or more before and after the XRD measurement. The obtained XRD data is subjected to peak search with use of JADE 6.0 (X-ray powder diffraction pattern integrated analysis software). In addition, the half-value width and integrated intensity of each peak are calculated. The conditions for peak search are as follows:
filter type: parabola filter,
Kα2 peak: eliminated,
peak position: peak top,
threshold value σ: 3,
peak intensity % cut-off: 0.1,
range for determining BG: 1, and
the number of points for averaging BG: 7.

Based on the obtained data, a total integrated intensity XO of the (211) plane ($2\theta$=around 20.7°), the (104) plane ($2\theta$=around 25.1°), and the (220) plane ($2\theta$=around 26.1°) of the zeolite can be calculated.

Then, the integrated intensities of the peaks of the (211) plane, the (104) plane, and the (220) plane of the zeolite are employed here because influence of water absorption by the sample is small.

In the zeolite of the present invention, the total integrated intensity is preferably 55,000 or more.

One feature of the zeolite of the present invention is that a Ce/Al molar ratio is 0.01 to 0.03. Heat resistance is improved (suppression of structural fracture of zeolite due to heat) when the Ce/Al molar ratio is set to 0.01 or more and the oxidation of ammonia acting as a reducing agent can be prevented when the Ce/Al molar ratio is set to 0.03 or less. More preferably, the Ce/Al molar ratio is 0.01 to 0.02.

Another feature of the zeolite of the present invention is that the Cu/Al molar ratio is 0.25 to 0.48. The amount of Cu can be increased when the Cu/Al molar ratio is set to 0.25 or more and Cu can be prevented from being present as CuO without being ion-exchanged when the Cu/Al molar ratio is set to 0.48 or less. Thereby, it is possible to provide zeolite that is excellent in NOx purifying performance and particularly is excellent in NOx purifying performance after heat endurance. More preferably, the Cu/Al molar ratio is 0.30 to 0.45.

The Ce/Al molar ratio and the Cu/Al molar ratio of the zeolite can be measured and calculated using a fluorescent X-ray analyzer.

Cu ion exchange is carried out by immersing the zeolite in at least one Ce solution (for example, an aqueous solution) selected from cerium (III) acetate, cerium sulfate, and cerium nitrate.

The concentration of Ce in the Ce solution is preferably, for example, 0.1 to 0.5 mol/L.

The temperature of the Ce solution is preferably from room temperature to 80° C.

The pressure during Ce ion exchange is preferably atmospheric pressure.

The immersion time in the Ce solution is preferably 0.1 hour to 24 hours.

Cu ion exchange is carried out by immersing the zeolite in at least one Cu solution (for example, an aqueous solution) selected from an aqueous solution of copper acetate, an aqueous solution of copper nitrate, an aqueous solution of copper sulfate, and an aqueous solution of copper chloride. From these aqueous solutions, the aqueous solution of copper acetate is preferably used. The reason for this is that a large amount of Cu can be carried at once.

The concentration of Cu in the Cu solution is 0.1 to 2.5 mass %.

The temperature of Cu solution is preferably from room temperature to 50° C.

The pressure during Cu ion exchange is preferably atmospheric pressure.

The immersion time in the Cu solution is preferably 0.1 hour to 24 hours.

The zeolite of the present invention has an average particle size of preferably 0.5 μm and more preferably 0.1 to 0.4 μm. In a case where such zeolite having a small average particle size is used to produce a honeycomb catalyst, the amount of water absorption displacement is small. Therefore, cracks are unlikely to occur during production and use as a catalyst, and endurance is excellent. On the other hand, when the average particle size exceeds 0.5 μm, the amount of water absorption displacement becomes large when the zeolite is formed into a honeycomb catalyst, which may cause cracks in the honeycomb catalyst.

The average particle size of the zeolite is obtained by taking a SEM photograph of the zeolite with a scanning electron microscope (SEM S-4800, manufactured by Hitachi High-Technologies Corporation) and averaging the lengths of all diagonal lines of 10 particles. The measurement conditions are set to acceleration voltage: 1 kV, emission: 10 μA, and WD: 2.2 mm or less. In general, the particles of the CHA-type zeolite have a cubic shape and have a square shape in a two-dimensional SEM photograph. Accordingly, each particle includes two diagonal lines.

The $SiO_2/Al_2O_3$ composition ratio (SAR) of the zeolite of the present invention is less than 15. The $SiO_2/Al_2O_3$ composition ratio refers to a molar ratio (SAR) of $SiO_2$ relative to $Al_2O_3$ in the zeolite. Since the $SiO_2/Al_2O_3$ composition ratio is less than 15, the number of acid sites of the zeolite can be made sufficient. The acid sites can be used in ion-exchange with metal ions and a large amount of Cu can be carried, and thus the zeolite has excellent NOx purifying performance.

More preferably, the $SiO_2/Al_2O_3$ composition ratio is 10 to 14.9.

The molar ratio ($SiO_2/Al_2O_3$) of the zeolite can be measured by fluorescent X-ray analysis (XRF).

<Producing Method>

Next, a method for producing the zeolite of the present invention will be described.

The method for producing the zeolite of the present invention includes synthesizing the zeolite by reacting a raw material composition containing a Si source, an Al source, an alkali source, water, and a structure directing agent.

In the method for producing the zeolite of the present invention, first, a raw material composition containing a Si source, an Al source, an alkali source, water, and a structure directing agent is prepared.

The Si source refers to a compound, salt or composition that is a raw material of a silicon component in the zeolite.

As the Si source, for example, colloidal silica, amorphous silica, sodium silicate, tetraethyl orthosilicate, and an alumino-silicate gel may be used, and two or more of these may be used in combination. Among these, the colloidal silica is preferred.

Examples of the Al source may include aluminum sulfate, sodium aluminate, aluminum hydroxide, aluminum chloride, alumino-silicate gel, and dried aluminum hydroxide gel. Among these, dried aluminum hydroxide gel is preferred.

In the method for producing the zeolite of the present invention, it is desirable to use the Si source and Al source having the same molar ratio ($SiO_2/Al_2O_3$) of substantially produced zeolite in order to produce the target CHA-type zeolite. The molar ratio ($SiO_2/Al_2O_3$) in the raw material composition is preferably 5 to 30 and more preferably 10 to 15.

Examples of the alkali source may include sodium hydroxide, potassium hydroxide, rubidium hydroxide, cesium hydroxide, lithium hydroxide, alkali components in aluminate and silicate, and an alkali component in an alumino-silicate gel. Two or more of these may be used in combination. The potassium hydroxide, the sodium hydroxide, and the lithium hydroxide are preferred. For obtaining a single phase of zeolite, the potassium hydroxide is especially preferred.

The amount of water is not particularly limited. A ratio of the number of moles of water to the total number of moles of Si in the Si source and Al in the Al source (number of moles of H2O/total number of moles of Si and Al) is preferably 12 to 30, and a ratio of the number of moles of water to the total number of moles of Si in the Si source and Al in the Al source (number of moles of H2O/total number of moles of Si and Al) is more preferably 15 to 25.

The structure directing agent (hereafter, also referred to as SDA) indicates an organic molecule defining a pore size, a crystal structure, and the like of the zeolite. In accordance with the kind and the like of the structure directing agent, the structure and the like of the obtained zeolite can be controlled.

As the structure directing agent, there can be used at least one selected from the group consisting of hydroxide, halides, carbonates, methyl carbonates, sulfates, and nitrates, each of which contains N,N,N-trialkyladamantane ammonium as a cation; and hydroxides, halides, carbonates, methyl carbonates, sulfates, and nitrates, each of which contains an N,N,N-trimethyl benzyl ammonium ion, an N-alkyl-3-quinuclidinol ion, or N,N,N-trialkyl exoamino norbornane as a cation. Among these, preferred is at least one selected from the group consisting of N,N,N-trimethyl adamantane ammonium hydroxide (hereafter, also referred to as TMAAOH), N,N,N-trimethyl adamantane ammonium halide, N,N,N-trimethyl adamantane ammonium carbonate, N,N,N-trimethyl adamantane ammonium methyl carbonate, and N,N,N-trimethyl adamantane ammonium sulfate. More preferred is TMAAOH.

In the method for producing the zeolite of the present invention, a seed crystal of the zeolite may be further added to the raw material composition. The use of the seed crystal increases a crystallization rate of the zeolite, whereby a time for the production of the zeolite can be shortened, and the yield is improved.

As the seed crystal of the zeolite, the zeolite having the CHA structure is desirably used.

The additional amount of the seed crystal of the zeolite is preferably small. In consideration of the reaction speed and the effect of suppressing impurities, the additional amount is preferably 0.1 to 20% by mass and more preferably 0.5 to 15% by mass relative to the amount of the silica component contained in the raw material composition. When the additional amount is less than 0.1% by mass, the contribution of improving the crystallization rate of zeolite is small, and when the additional amount exceeds 20% by mass, impurities are likely to enter the zeolite obtained by synthesis.

In the method for producing the zeolite of the present invention, the zeolite is synthesized by reaction of the prepared raw material composition. Specifically, the zeolite is preferably synthesized by hydrothermal synthesis of the raw material composition.

A reaction vessel used for the hydrothermal synthesis is not particularly limited as long as it is usable for the known hydrothermal synthesis, and may be a heat and pressure-resistant vessel such as an autoclave. The raw material composition is charged into the reaction vessel, the reaction vessel is sealed and heated, thereby crystallizing the zeolite.

In the case of synthesizing the zeolite, a raw material mixture may be in a stationary state but is preferably mixed under stirring.

The heating temperature in the case of synthesizing the zeolite is preferably 100 to 200° C. and more preferably 120 to 180° C. When the heating temperature is lower than 100° C., the crystallization rate may be slow, and the yield tends to lower. On the other hand, when the heating temperature is higher than 200° C., impurities tend to be generated.

The heating time in the case of synthesizing the zeolite is preferably 10 to 200 hours. If the heating time is shorter than 10 hours, unreacted raw materials may remain, and the yield tends to lower. On the other hand, if the heating time is longer than 200 hours, the yield or crystallinity is not improved any more.

The pressure in the case of synthesizing the zeolite is not particularly limited and may satisfactorily be a pressure generated during heating of the raw material composition in the sealed vessel within the above temperature range; however, if necessary, an inert gas such as nitrogen gas may be added to increase the pressure.

In the method for producing the zeolite of the present invention, after being synthesized by the above method, the zeolite is preferably sufficiently cooled, solid-liquid separated, washed with a sufficient amount of water.

The synthesized zeolite contains the SDA in pores, and accordingly, the SDA may be removed, if needed. For example, the SDA can be removed by liquid phase treatment using an acidic solution or a liquid chemical containing a SDA-decomposing component, exchange treatment using a resin, or thermal decomposition.

The synthesized zeolite is ion-exchanged with Ce and Cu by the above-described method to obtain the zeolite of the present invention.

<Honeycomb Catalyst>

Next, the honeycomb catalyst of the present invention will be described.

The honeycomb catalyst of the present invention is a honeycomb catalyst including a honeycomb unit having a plurality of through holes extending in parallel in the longitudinal direction while being separated from one another by partition walls, wherein the honeycomb unit contains zeolite and an inorganic binder, the zeolite being the zeolite of the present invention.

FIG. 1 illustrates an example of the honeycomb catalyst of the present invention. A honeycomb catalyst 10 illustrated in FIG. 1 includes a single honeycomb unit 11 in which a plurality of through holes 11a extend in parallel in the longitudinal direction while being separated from one another by partition walls 11b. On an outer peripheral surface of the honeycomb unit 11, an outer peripheral coat layer 12 is formed. Moreover, the honeycomb unit 11 contains zeolite and an inorganic binder.

In the honeycomb catalyst of the present invention, a partition wall of a honeycomb unit has a maximum peak pore size (hereafter, sometimes referred to as a maximum peak pore size of the honeycomb unit) of preferably 0.03 to 0.15 μm and more preferably 0.05 to 0.10 μm. When the maximum peak pore size of the honeycomb unit is less than 0.03 μm, the exhaust gas cannot be sufficiently diffused into the partition walls and the NOx purifying performance may be deteriorated, and when the maximum peak pore size of the honeycomb unit exceeds 0.15 μm, the number of pores is reduced and thus zeolite may not be effectively used for NOx purification.

The pore size of the honeycomb unit can be measured using mercury porosimetry[1]. At this time, the pore size is measured within a range of 0.01 to 100 μm when a contact angle of mercury is set to 130° and the surface tension is set to 485 mN/m. A value of the pore size at a time when the pore size reaches a maximum peak within this range is referred to as the maximum peak pore size.

[1] 「水銀圧入法」 mercury porosimetry

In the honeycomb catalyst of the present invention, the honeycomb unit has a porosity of preferably 40 to 70%. If the porosity of the honeycomb unit is less than 40%, exhaust gases are less likely to permeate inside the partition wall of the honeycomb unit, so that the zeolite is not effectively used for NOx purification. If the porosity of the honeycomb unit is more than 70%, the strength of the honeycomb unit becomes insufficient.

The porosity of the honeycomb unit can be measured by a gravimetric method.

A measuring method of the porosity by the gravimetric method is as follows.

The honeycomb unit is cut into a measurement sample in a size of 7 cells×7 cells×10 mm, and this sample is subjected to ultrasonic cleaning with ion exchange water and acetone, followed by drying at 100° C. in an oven. Subsequently, the size of the cross section of the sample is measured with a measuring microscope (Measuring Microscope MM-40 manufactured by Nikon Corporation; 100 magnifications), and a volume thereof is obtained from a geometrical calculation. In a case where the volume cannot be obtained from the geometrical calculation, the volume is calculated by image processing on the cross-sectional photograph.

Then, based on the calculated volume and a true density of the sample measured with a pycnometer, a weight is calculated on the assumption that the sample is a complete dense body.

The measurement with pycnometer is performed as follows. The honeycomb unit is powdered to prepare 23.6 cc of powder, and the obtained powder is dried at 200° C. for eight hours. Then, the true density is measured with Auto Pycnometer 1320 (manufactured by Micromeritics Instrument Corporation) in conformity with JIS-R-1620 (1995). At this time, the exhaustion time is set to 40 min.

Next, an actual weight of the sample is measured with an electronic balance (HR202i, manufactured by Shimadzu Corporation), and the porosity is calculated by the following formula:

Porosity (%)=100−(Actual weight/Weight as dense body)×100%.

In the honeycomb catalyst of the present invention, the zeolite contained in the honeycomb unit is the zeolite having the CHA structure described above of the present invention. The zeolite of the present invention has been described above, and thus the detailed description thereof will not be presented herein.

The amount of the zeolite contained in the honeycomb unit is preferably 40 to 90 vol % and more preferably 50 to 80 vol %. If the content of the zeolite is less than 40 vol %, the NOx purifying performance is lowered. On the other hand, if the content of the zeolite exceeds 90 vol %, the strength tends to be lowered as the amount of other materials is too small.

In the honeycomb catalyst of the present invention, the honeycomb unit may contain zeolite other than the CHA-type zeolite and silicoaluminophosphate (SAPO) within the range in which the effects of the present invention are not impaired.

In the honeycomb catalyst of the present invention, the honeycomb unit contains the zeolite of the present invention in the amount of preferably 100 to 320 g/L and more preferably 120 to 300 g/L based on the apparent volume of the honeycomb unit. If the content of the zeolite of the present invention is less than 100 g/L, the NOx purifying performance may be lowered, and when it exceeds 320 g/L, the strength of the honeycomb unit may decrease.

In the honeycomb catalyst of the present invention, the inorganic binder contained in the honeycomb unit is not particularly limited. However, from a viewpoint of maintaining strength as the honeycomb catalyst, preferable examples of the inorganic binder include solid contents contained in alumina sol, silica sol, titania sol, water glass, sepiolite, attapulgite, and boehmite, and two or more thereof may be used in combination.

The amount of the inorganic binder contained in the honeycomb unit is preferably 3 to 20 vol % and more preferably 5 to 15 vol %. If the content of the inorganic binder is less than 3 vol %, the strength of the honeycomb unit decreases.

On the other hand, if the content of the inorganic binder exceeds 20 vol %, the amount of the zeolite contained in the honeycomb unit is reduced and the NOx purifying performance is lowered.

In the honeycomb catalyst of the present invention, the honeycomb unit may further contain inorganic particles for adjusting the pore size of the honeycomb unit.

The inorganic particles contained in the honeycomb unit are not particularly limited, and examples thereof include particles made of alumina, titania, zirconia, silica, ceria, and magnesia. Two or more of these may be used in combination. The inorganic particles are preferably particles of at least one selected from the group consisting of alumina, titania, and zirconia, and more preferably particles of any one selected from the group consisting of alumina, titania, and zirconia.

The inorganic particles have an average particle size of preferably 0.01 to 1.0 μm and more preferably 0.03 to 0.5 μm. When the inorganic particles have an average particle size of 0.01 to 1.0 μm, the pore size of the honeycomb unit can be adjusted.

The average particle size of the inorganic particles is a particle size (Dv50) corresponding to a 50% integral value in the grain size distribution (in volume base) obtained by a laser diffraction/scattering method.

The amount of the inorganic particles contained in the honeycomb unit is preferably 10 to 40 vol % and more preferably 15 to 35 vol %. If the content of the inorganic particles is less than 10 vol %, the addition of inorganic particles gives only a small effect of lowering the absolute value of the linear expansion coefficient of the honeycomb unit and the honeycomb unit tends to be damaged by a thermal stress. On the other hand, if the content of the inorganic particles exceeds 40 vol %, the content of the zeolite is reduced and the NOx purifying performance is lowered.

The zeolite and the inorganic particles have a volume ratio (CHA-type zeolite:inorganic particles) of preferably 50:50 to 90:10 and more preferably 60:40 to 80:20. With the volume ratio of the zeolite and the inorganic particles within the above range, the pore size of the honeycomb unit can be adjusted while the NOx purifying performance is maintained.

In the honeycomb catalyst of the present invention, preferably, the honeycomb unit further contains at least one selected from the group consisting of inorganic fibers and scale-like materials for the purpose of enhancing the strength.

The inorganic fibers contained in the honeycomb unit are preferably made of at least one selected from the group consisting of alumina, silica, silicon carbide, silica alumina, glass, potassium titanate, and aluminum borate. The scale-like materials contained in the honeycomb unit are preferably made of at least one selected from the group consisting of glass, white mica, alumina, and silica. All of these materials have high heat resistance and, even when used as catalyst carriers in the SCR system, there is no erosion and the effect as a reinforcing material can be sustained.

The amount of the inorganic fibers and the scale-like materials contained in the honeycomb unit is preferably 3 to 30 vol %, and more preferably 5 to 20 vol %. If the content is less than 3 vol %, the effect of improving the strength of the honeycomb unit is reduced. On the other hand, if the content exceeds 30 vol %, the amount of the zeolite contained in the honeycomb unit is reduced and the NOx purifying performance is lowered.

In the honeycomb catalyst of the present invention, the cross section orthogonal to the longitudinal direction of the honeycomb unit preferably has an aperture ratio of 50 to 75%. If the aperture ratio of the cross section orthogonal to the longitudinal direction of the honeycomb unit is less than 50%, the zeolite is not effectively used for the NOx purification. On the other hand, if the aperture ratio of the cross section orthogonal to the longitudinal direction of the honeycomb unit exceeds 75%, the strength of the honeycomb unit becomes insufficient.

In the honeycomb catalyst of the present invention, the cross section orthogonal to the longitudinal direction of the honeycomb unit preferably has a through-hole density of 31 to 155 pcs/cm². If the through-hole density of the cross section orthogonal to the longitudinal direction of the honeycomb unit is less than 31 pcs/cm², the zeolite and exhaust gases are less likely to contact each other, the NOx purifying performance is lowered. Meanwhile, if the through-hole density of the cross section orthogonal to the longitudinal direction of the honeycomb unit exceeds 155 pcs/cm², the pressure loss of the honeycomb catalyst increases.

In the honeycomb catalyst of the present invention, the partition walls of the honeycomb unit have a thickness of preferably 0.1 to 0.4 mm, and more preferably 0.1 to 0.3 mm. If the partition wall of the honeycomb unit has a thickness of less than 0.1 mm, the strength of the honeycomb unit is lowered. On the other hand, if the partition wall of the honeycomb unit has a thickness of more than 0.4 mm, the exhaust gases are less likely to permeate inside the partition walls of the honeycomb unit, so that the zeolite is not effectively used for the NOx purification.

In the honeycomb catalyst of the present invention, when an outer peripheral coat layer is formed on the honeycomb unit, the outer peripheral coat layer preferably has a thickness of 0.1 to 2.0 mm. If the outer peripheral coat layer has a thickness of less than 0.1 mm, the effect of improving the strength of the honeycomb catalyst becomes insufficient. Meanwhile, if the outer peripheral coat layer has a thickness of more than 2.0 mm, the zeolite content per unit volume of the honeycomb catalyst is reduced and the NOx purifying performance is lowered.

The shape of the honeycomb catalyst of the present invention is not limited to a round pillar shape and may be a rectangular pillar shape, a cylindroid shape, a pillar shape with a racetrack end face, or a round-chamfered polygonal pillar shape (e.g., round-chamfered triangular pillar shape).

In the honeycomb catalyst of the present invention, the shape of the through holes is not limited to a rectangular pillar shape, but may be a triangular pillar shape or a hexagonal pillar shape.

Next, a description is given on one example of a method for producing the honeycomb catalyst 10 illustrated in FIG. 1.

First, a raw material paste is prepared which contains zeolite, an inorganic binder, and if necessary, inorganic particles and at least one selected from the group consisting of inorganic fibers and scale-like materials. The raw material paste is extrusion-molded to provide a round pillar-shaped honeycomb molded body including a plurality of through holes extending in parallel in the longitudinal direction while being separated from one another by partition walls.

The inorganic binder contained in the raw material paste is not particularly limited, and examples thereof include alumina sol, silica sol, titania sol, water glass, sepiolite, attapulgite, and boehmite. Two or more of these may be used in combination.

The raw material paste may be appropriately added with an organic binder, a dispersing medium, a molding aid, and the like, if necessary.

The organic binder is not particularly limited, and examples thereof include methyl cellulose, carboxy methyl cellulose, hydroxyethyl cellulose, polyethylene glycol, phenolic resins, and epoxy resins. Two or more of these may be used in combination. The amount of the organic binder to be added is preferably 1 to 10% relative to the total weight of the zeolite, inorganic particles, inorganic binder, inorganic fibers, and scale-like materials.

The dispersing medium is not particularly limited, and examples thereof include water, organic solvents such as benzene, and alcohols such as a methanol. Two or more of these may be used in combination.

The molding aid is not particularly limited, and examples thereof include ethylene glycol, dextrin, fatty acid, fatty acid soap, and polyalcohol. Two or more of these may be used in combination.

Further, the raw material paste may be added with a pore-forming material, if necessary.

The pore-forming material is not particularly limited, and examples thereof include polystyrene particles, acrylic particles, and starch. Two or more of these may be used in combination. Among these, preferred are polystyrene particles.

The particle size of the zeolite and the pore-forming material are controlled, whereby the pore size distribution of the partition wall can be controlled within a predetermined range.

Even in a case where a pore-forming material is not added, the particle sizes of the zeolite and the inorganic particles are controlled, and thus the pore size distribution of the partition wall can be controlled within a predetermined range.

When the raw material paste is prepared, it is desirable that the raw material paste be mixed and kneaded, or the raw material paste may be mixed using a mixer, an attritor or the like, or the raw material paste may be kneaded using a kneader and the like.

Next, the honeycomb molded body is dried using a dryer, for example, a microwave dryer, a hot air dryer, a dielectric dryer, a decompression dryer, a vacuum dryer, or a freeze dryer to prepare a honeycomb dried body.

Further, the honeycomb dried body is degreased to prepare a honeycomb degreased body. A degreasing condition may be appropriately selected in accordance with the kind and amount of the organic substance contained in the honeycomb dried body, and is preferably 200 to 500° C. for 2 to 6 hours.

Next, the honeycomb degreased body is fired to prepare a round pillar-shaped honeycomb unit 11. A firing temperature is preferably 600 to 1000° C. and more preferably 600 to 800° C. If the firing temperature is lower than 600° C., the sintering does not proceed well, resulting in poor strength of the honeycomb unit 11. Meanwhile, if the firing temperature is higher than 1000° C., reaction sites of the zeolite are reduced.

Next, an outer peripheral coat layer paste is applied to the outer peripheral surfaces, except for the both end faces, of the round pillar-shaped honeycomb unit 11.

The outer peripheral coat layer paste is not particularly limited, and examples thereof include a mixture of an inorganic binder and inorganic particles, a mixture of an inorganic binder and inorganic fibers, and a mixture of an inorganic binder, inorganic particles, and inorganic fibers.

The inorganic binder contained in the outer peripheral coat layer paste is not particularly limited, and may be added in the form of a silica sol or an alumina sol. Two or more of the inorganic binders may be used in combination. In particular, the inorganic binder is preferably added in the form of the silica sol.

The inorganic particles contained in the outer peripheral coat layer paste are not particularly limited, and examples thereof include oxide particles made of zeolite, eucryptite, alumina, silica, or the like; carbide particles made of silicon carbide or the like; and nitride particles made of silicon nitride, boron nitride, or the like. Two or more of these may be used in combination. In particular, preferred are eucryptite particles, which have a thermal expansion coefficient similar to that of the honeycomb unit.

The inorganic fibers contained in the outer peripheral coat layer paste are not particularly limited, and examples thereof include silica alumina fibers, mullite fibers, alumina fibers, and silica fibers. Two or more of these may be used in combination. In particular, preferred are the alumina fibers.

The outer peripheral coat layer paste may further contain an organic binder.

The organic binder contained in the outer peripheral coat layer paste is not particularly limited, and examples thereof include polyvinyl alcohol, methyl cellulose, ethyl cellulose, and carboxy methyl cellulose. Two or more of these may be used in combination.

The outer peripheral coat layer paste may further contain balloons that are fine hollow spheres of an oxide-based ceramic, a pore-forming material, and the like.

The balloons contained in the outer peripheral coat layer paste are not particularly limited, and examples thereof include alumina balloons, glass microballoons, shirasu balloons, fly ash balloons, and mullite balloons. Two or more of these may be used in combination. Among these, preferred are the alumina balloons.

The pore-forming material contained in the outer peripheral coat layer paste is not particularly limited, and examples thereof include spherical acrylic particles and graphite. Two or more of these may be used in combination.

Next, the honeycomb unit 11, to which the outer peripheral coat layer paste is applied, is dried and solidified, and thus the round pillar-shaped honeycomb catalyst 10 is prepared. In a case where the outer peripheral coat layer paste contains an organic binder at this time, degreasing is preferably performed. A degreasing condition may be appropriately select in accordance with the kind and amount of the organic material, and is preferably 500° C. for one hour.

The exhaust gas purifying apparatus of the present invention includes the above-described honeycomb catalyst.

Figure 2:
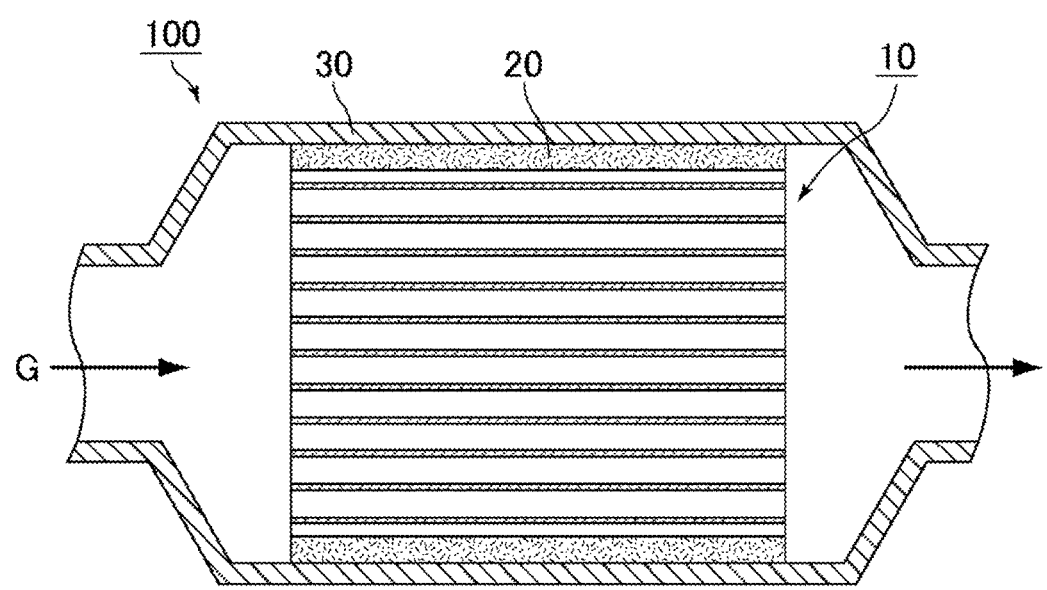
FIG. 2 is a sectional view schematically illustrating an example of an exhaust gas purifying apparatus according to the present invention.

FIG. 2 illustrates one example of an exhaust gas purifying apparatus of the present invention. An exhaust gas purifying apparatus 100 of the present invention includes the honeycomb catalyst 10, a holding sealing material 20 arranged on the outer peripheral portion of the honeycomb catalyst 10, and a metallic container 30 into which the honeycomb catalyst 10 provided with the holding sealing material 20 is incorporated (canned). The exhaust gas purifying apparatus 100 can be manufactured by canning the honeycomb catalyst 10 into the metallic container (shell) 30 in a state where the holding sealing material 20 is arranged on the outer peripheral portion of the honeycomb catalyst 10. In the exhaust gas purifying apparatus 100, a spraying unit (not illustrated) such as a spraying nozzle for spraying ammonia or a compound to be decomposed to generate ammonia is provided inside a piping (not illustrated) on an upstream side of the honeycomb catalyst 10 in a flowing direction of exhaust gases (in FIG. 2, exhaust gases are indicated by G and the flow is indicated by an arrow). With this configuration, since ammonia is added to the exhaust gases flowing inside the piping, the zeolite contained in the honeycomb unit 11 reduces NOx contained in the exhaust gases.

The compound to be decomposed to generate ammonia is not particularly limited as long as it is hydrolized inside the piping to generate ammonia. Preferred is urea water as it is excellent in storage stability.

Figure 3:
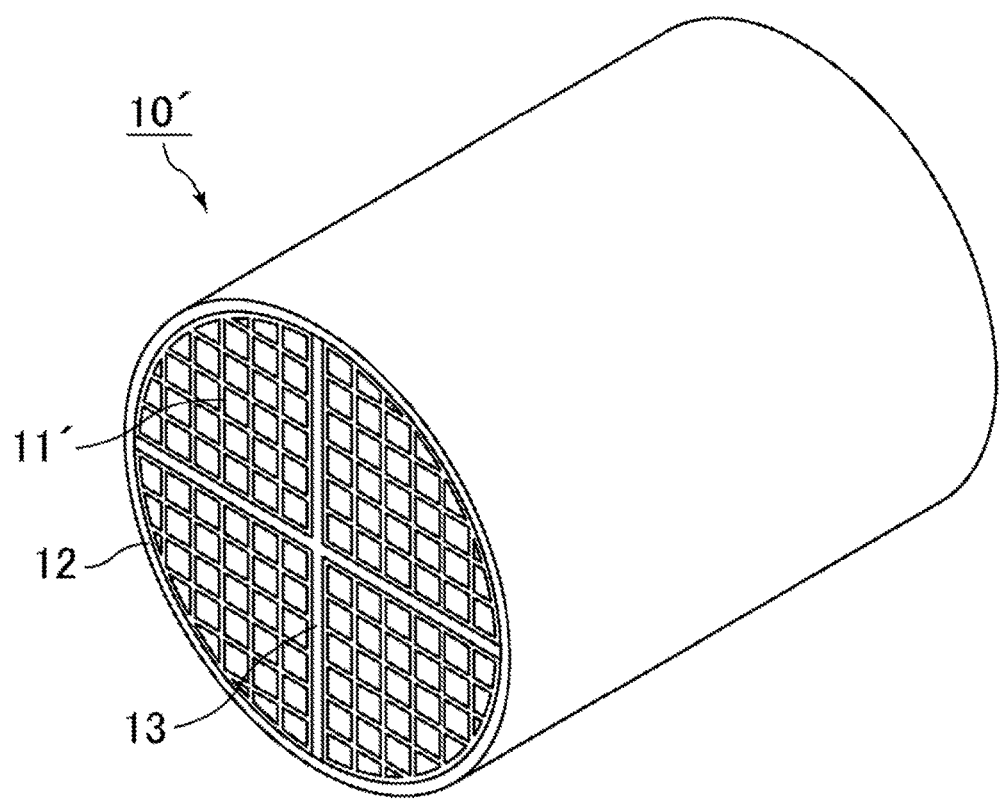
FIG. 3 is a perspective view schematically illustrating another example of a honeycomb catalyst according to the present invention.
Figure 4:
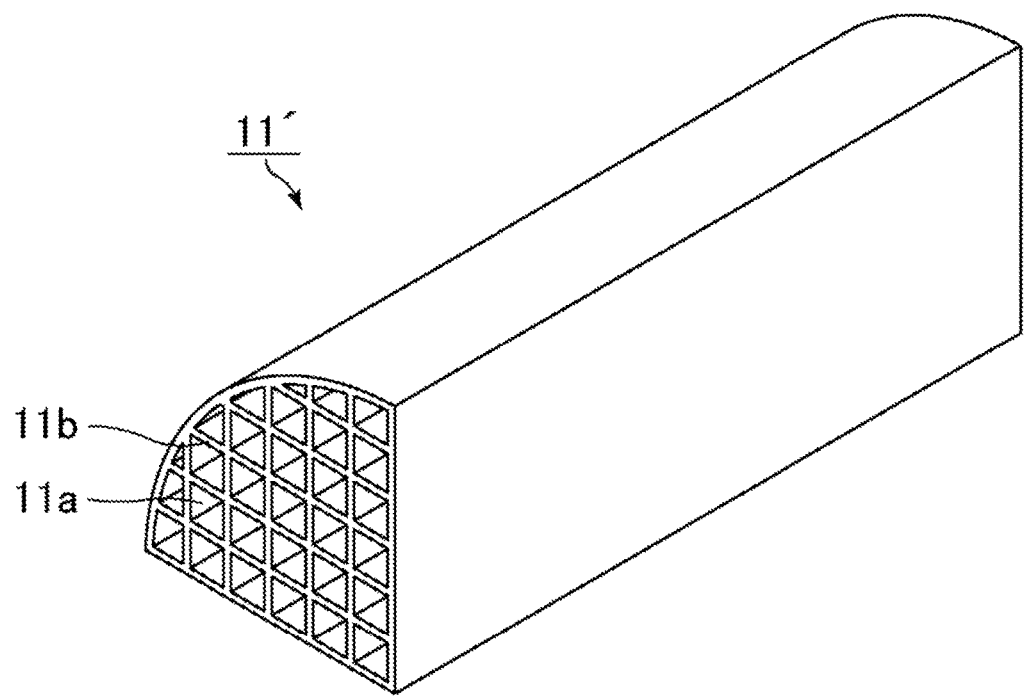
FIG. 4 is a perspective view schematically illustrating an example of a honeycomb unit forming another honeycomb catalyst of the present invention.

FIG. 3 illustrates another example of the honeycomb catalyst of the present invention. A honeycomb catalyst 10' illustrated in FIG. 3 has the same configuration as the honeycomb catalyst 10, except that a plurality of honeycomb units 11' (see FIG. 4) including a plurality of through holes 11a extending in parallel in the longitudinal direction while being separated from one another by partition walls 11b are bonded to each other through an adhesive layer 13.

The cross section orthogonal to the longitudinal direction of the honeycomb unit 11' preferably has an area of 10 to 200 cm2. If the cross-sectional area is less than 10 cm2, the honeycomb catalyst 10' has a greater pressure loss. Meanwhile, if the cross-sectional area exceeds 200 cm2, the honeycomb units 11' are hardly bonded to one another.

The honeycomb unit 1F has the same configuration as the honeycomb unit 11, except for the area of the cross section orthogonal to the longitudinal direction.

The adhesive layer 13 preferably has a thickness of 0.1 to 3.0 mm. If the adhesive layer 13 has a thickness of less than 0.1 mm, the bonding strength of the honeycomb units 1F becomes insufficient. Meanwhile, if the adhesive layer 13 has a thickness of more than 3.0 mm, the honeycomb catalyst 10' may have a greater pressure loss or cracks may occur in the adhesive layer.

Next, an example of a method for producing the honeycomb catalyst 10' illustrated in FIG. 3 will be described.

First, the sectorial pillar-shaped honeycomb units 11' are manufactured in the same manner as in the case of the honeycomb unit 11 included in the honeycomb catalyst 10. Next, an adhesive layer paste is applied to the outer peripheral surfaces of the honeycomb units 11', except for the surfaces on the arc side, and the honeycomb units 11' are bonded. The honeycomb units 11' are dried and solidified, and thus an aggregate of the honeycomb units 11' is manufactured.

The adhesive layer paste is not particularly limited, and examples thereof include a mixture of an inorganic binder and inorganic particles, a mixture of an inorganic binder and inorganic fibers, and a mixture of an inorganic binder, inorganic particles, and inorganic fibers.

The inorganic binder contained in the adhesive layer paste is not particularly limited, and may be added in the form of a silica sol or an alumina sol. Two or more of the inorganic binders may be used in combination. In particular, the inorganic binder is preferably added in the form of the silica sol.

The inorganic particles contained in the adhesive layer paste are not particularly limited, and examples thereof include oxide particles made of zeolite, eucryptite, alumina, silica, or the like; carbide particles made of silicon carbide or the like; and nitride particles made of silicon nitride, boron nitride, or the like. Two or more of these may be used in combination. In particular, preferred are eucryptite particles which have a thermal expansion coefficient similar to that of the honeycomb unit.

The inorganic fibers contained in the adhesive layer paste are not particularly limited, and examples thereof include silica alumina fibers, mullite fibers, alumina fibers, and silica fibers. Two or more of these may be used in combination. In particular, preferred are alumina fibers.

The adhesive layer paste may further contain an organic binder.

The organic binder contained in the adhesive layer paste is not particularly limited, and examples thereof include polyvinyl alcohol, methyl cellulose, ethyl cellulose, and carboxy methyl cellulose. Two or more of these may be used in combination.

The adhesive layer paste may further contain balloons that are fine hollow spheres of oxide-based ceramic, and a pore-forming material.

The balloons contained in the adhesive layer paste are not particularly limited, and examples thereof include alumina balloons, glass microballoons, shirasu balloons, fly ash balloons, and mullite balloons. Two or more of these may be used in combination. In particular, preferred are alumina balloons.

The pore-forming material contained in the adhesive layer paste is not particularly limited, and examples thereof include spherical acrylic particles and graphite. Two or more of these may be used in combination.

In order to enhance circularity, the aggregate of the honeycomb units 11' is cut and ground according to needs, thereby preparing a round pillar-shaped aggregate of the honeycomb units 11'.

Next, an outer peripheral coat layer paste is applied to the outer peripheral surfaces, except for both end faces, of the round pillar-shaped aggregate of the honeycomb units 11'.

The outer peripheral coat layer paste may be the same as or different from the adhesive layer paste.

Next, the round pillar-shaped aggregate of the honeycomb units 11', to which the peripheral coat layer paste is applied, is dried and solidified, and thus the round pillar-shaped honeycomb catalyst 10' is prepared. At this time, in a case where the adhesive layer paste and/or the peripheral coat layer paste contains an organic binder, degreasing is preferably performed. The degreasing condition may be appropriately selected in accordance with the kind and the amount of the organic substance, and is preferably 500° C. for one hour.

Here, the honeycomb catalyst 10' includes four pieces of the honeycomb units 11' bonded to one another with the adhesive layer 13 therebetween; however, the number of honeycomb units included in the honeycomb catalyst is not particularly limited. For example, 16 pieces of rectangular pillar-shaped honeycomb units may be bonded to one another with an adhesive layer therebetween to form a round pillar-shaped honeycomb catalyst.

The honeycomb catalysts 10 and 10' may not have the outer peripheral coat layer 12.

As described above, in the honeycomb catalyst of the present invention, the honeycomb unit is formed using the zeolite of the present invention as zeolite to improve the NOx purifying performance.

EXAMPLES

Examples more specifically describing the present invention are given in the following. It is to be noted that the present invention is not limited only to these examples.

<Synthesis of Zeolite A>

A raw material composition was prepared by mixing colloidal silica (SNOWTEX, manufactured by Nissan Chemical Industries, Ltd.) as a Si source, a dried aluminum hydroxide gel (manufactured by Tomita Pharmaceutical Co., Ltd.) as an Al source, sodium hydroxide (manufactured by Tokuyama Corporation) and potassium hydroxide (manufactured by Toagosei Co., Ltd.) as alkali sources, a 25% aqueous solution of N,N,N-trimethyl adamantane ammonium hydroxide (TMAAOH) (manufactured by Sachem Inc.) as a structure directing agent (SDA), SSZ-13 as a seed crystal, and deionized water. A molar ratio of the raw material composition was set to have $SiO_2$: 15 mol, $Al_2O_3$: 1 mol, NaOH: 2.6 mol, KOH: 0.9 mol, TMAAOH: 1.1 mol, and H2O: 300 mol. To the $SiO_2$ and $Al_2O_3$ in the raw material composition, 5.0% by mass of the seed crystal was added. The raw material composition was charged into a 500-L autoclave and subjected to hydrothermal synthesis at a heating temperature of 160° C. for a heating time of 48 hours, thereby synthesizing zeolite "A".

Comparative Example 1

As described above, the synthesized zeolite "A" was subjected to ion exchange with an aqueous copper acetate (II) solution having a copper concentration of 2.34% by mass for the first ion exchange, and with an aqueous copper acetate (II) solution having a copper concentration of 0.59% by mass for the second ion exchange at a solution temperature of 50° C. under atmospheric pressure for one hour. Thus, zeolite of Comparative Example 1 was obtained.

Example 1

Ion exchange was carried out on the sample ion-exchanged in Comparative Example 1 for 24 hours at room temperature under atmospheric pressure using an aqueous cerium (III) acetate monohydrate solution having a cerium concentration of 9.22% by mass. This ion exchange operation was performed three times in total. Thus, zeolite of Example 1 was obtained.

Example 2

Ion exchange was carried out on the sample ion-exchanged in Comparative Example 1 for 24 hours under solution temperature of 50° C. and atmospheric pressure using an aqueous cerium (III) acetate monohydrate solution having a cerium concentration of 9.22% by mass. This ion exchange operation was performed twice in total. Thus, zeolite of Example 2 was obtained.

Comparative Example 2

Ion exchange was carried out on the sample ion-exchanged in Comparative Example 1 for 24 hours under solution temperature of 50° C. and atmospheric pressure using an aqueous cerium (III) acetate monohydrate solution having a cerium concentration of 9.22% by mass. This ion exchange operation was performed four times in total. Thus, zeolite of Comparative Example 2 was obtained.

Comparative Example 3

The zeolite "A" was subjected to ion exchange for one hour under solution temperature of 50° C. and atmospheric pressure using an aqueous copper acetate (II) solution having a copper concentration of 1.05% by mass for the first ion exchange.

Thereafter, ion exchange was carried out for 24 hours under room temperature and atmospheric pressure using an aqueous cerium (III) acetate monohydrate solution having a cerium concentration of 9.22% by mass. This ion exchange operation was performed twice in total. Thus, zeolite of Comparative Example 3 was obtained.

<Measurement of Amount of Ce and Cu to be Carried>

With a fluorescent X-ray analyzer (XRF: ZSX Primus 2, manufactured by Rigaku Corporation,), the amounts of Ce and Cu to be carried on the zeolite obtained in each of Examples 1 and 2 and Comparative Examples 1 to 3 were measured. Measurement conditions were set to X-ray tube: Rh, rated maximum output: 4 kW, element range of detection: F to U, quantification method: SQX method, and analyzing range: 10 mmφ. The molar ratio of Ce/Al and Cu/Al was calculated from the measurement values of the amounts of Ce and Cu to be carried.

<Measurement of Particle Size of Zeolite>

With a scanning electron microscope (SEM S-4800, manufactured by Hitachi High-Technologies Corporation), an SEM photograph of the zeolite obtained in each of Examples 1 and 2, and Comparative Examples 1 to 3 was taken and the particle size of the zeolite was measured. Measurement conditions were set to acceleration voltage: 1 kV, emission: 10 μA, and WD: 2.2 mm or less. The measuring magnification was set to 10000 times. The particle size was measured for ten particles measured based on two diagonal lines, and the average particle size of thereof was obtained.

<Measurement of Molar Ratio (SAR:$SiO_2$/$Al_2O_3$) of Zeolite>

With a fluorescent X-ray analyzer, (XRF: ZSX Primus2, manufactured by Rigaku Corporation), the molar ratio (SAR:$SiO_2$/$Al_2O_3$) of the zeolite obtained in each of Examples 1 and 2 and Comparative Examples 1 to 3 was measured. Measurement conditions were set to X-ray tube: Rh, rated maximum output: 4 kW, element range of detection: F to U, quantification method: SQX method, and analyzing range: 10 mmφ.

<Heat Endurance Test>

The zeolite obtained in each of Examples 1 and 2 and Comparative Examples 1 to 3 was subjected to a heat endurance test for five hours at 900° C. under an air atmosphere.

The conditions of the heat endurance test are as follows.

Zeolite was charged into a muffle furnace (KDF-S100 manufactured by Denken-highdental Co., Ltd.) while being placed by 10 g on a magnetic dish (5.8 cm×9.1 cm), heated up to 900° C. at a temperature rising rate of 0.5° C./min under an air atmosphere, and kept at 900° C. for five hours.

<Analysis of Crystal Structure of Zeolite>

With an X-ray diffractometer (Ultima IV, manufactured by Rigaku Corporation), the zeolite obtained in each of Examples 1 and 2 and Comparative Examples 1 to 3 was subjected to XRD measurement before (initial) heat endurance test and after heat endurance test, and a total integrated intensity of (211) plane, (104) plane, and (220) plane of an X-ray diffraction spectrum was calculated.

The measurement conditions were set to radiation source: CuKα (λ=0.154 nm), measurement method: FT method, diffraction angle: 2θ=5 to 48°, step width: 0.02°, integration time: 1 second, divergence slit and scattering slit: 2/3°, vertical divergence limiting slit: 10 mm, acceleration voltage: 40 kV, and acceleration current: 40 mA.

The obtained XRD data was analyzed with use of JADE 6.0 (X-ray powder diffraction pattern integrated analysis software). The analysis conditions were set to filter type: parabola filter, Kα2 peak: eliminated, peak position: peak top, threshold value σ: 3, peak intensity % cut-off: 0.1, range for determining BG: 1, and the number of points for averaging BG: 7.

Figure 5:
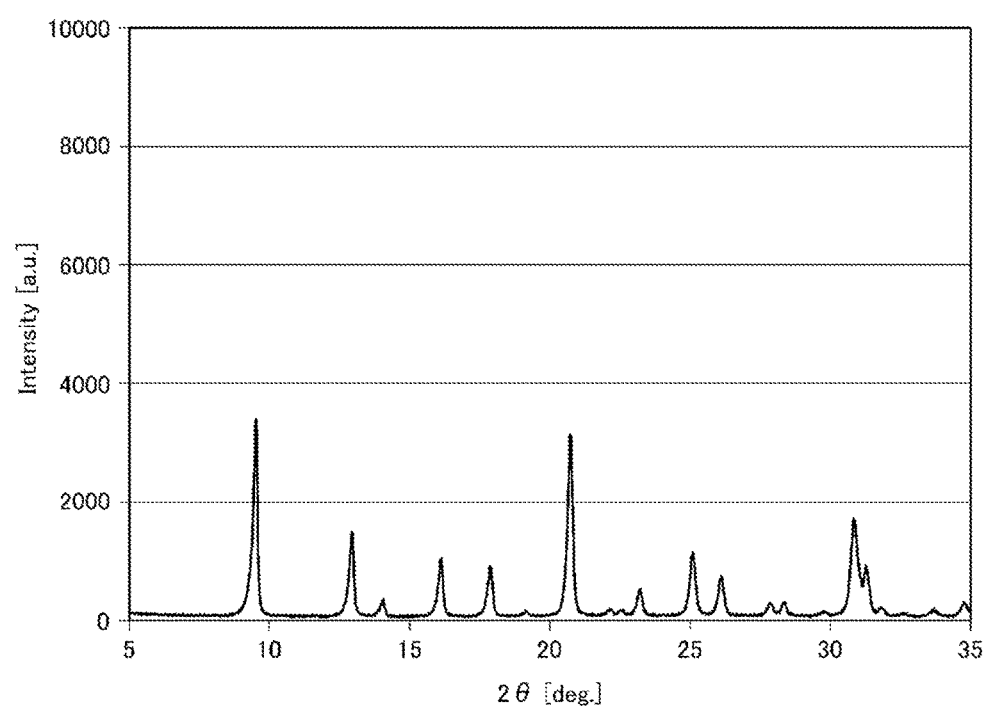
FIG. 5 is a chart illustrating an (initial) XRD pattern of zeolite synthesized in synthesis of "zeolite A".

FIG. 5 illustrates an (initial) XRD pattern synthesized by the "synthesis of zeolite A". From FIG. 5, it was confirmed that the synthesized zeolite had a CHA structure.

Figure 6:
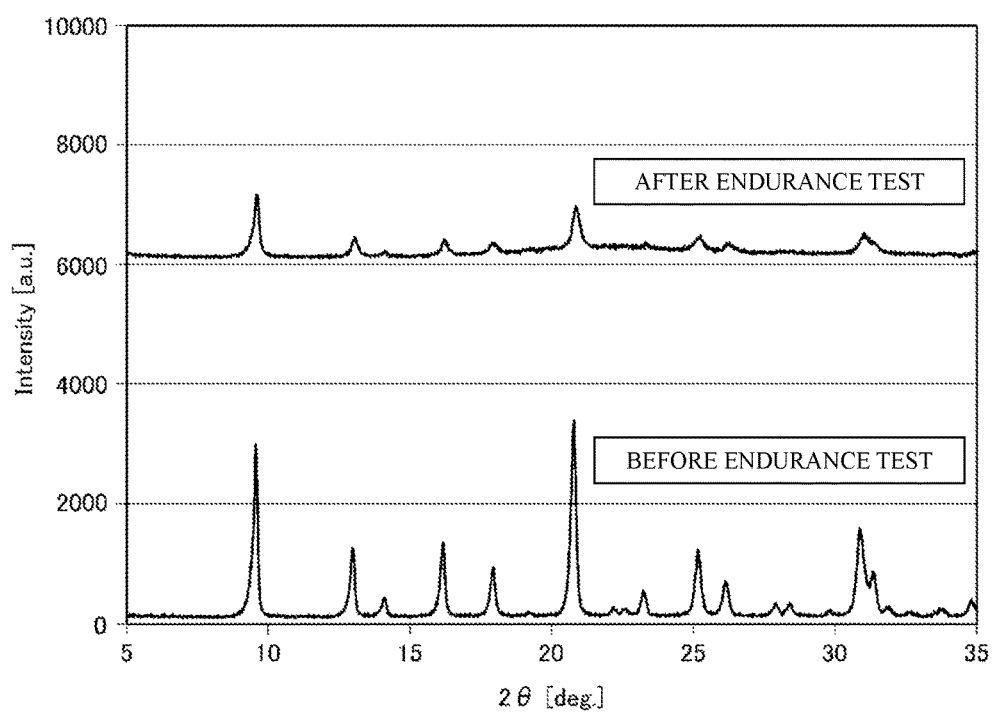
FIG. 6 is a chart illustrating an XRD pattern of zeolite (before and after a heat endurance test) synthesized in Comparative Example 1.
Figure 7:
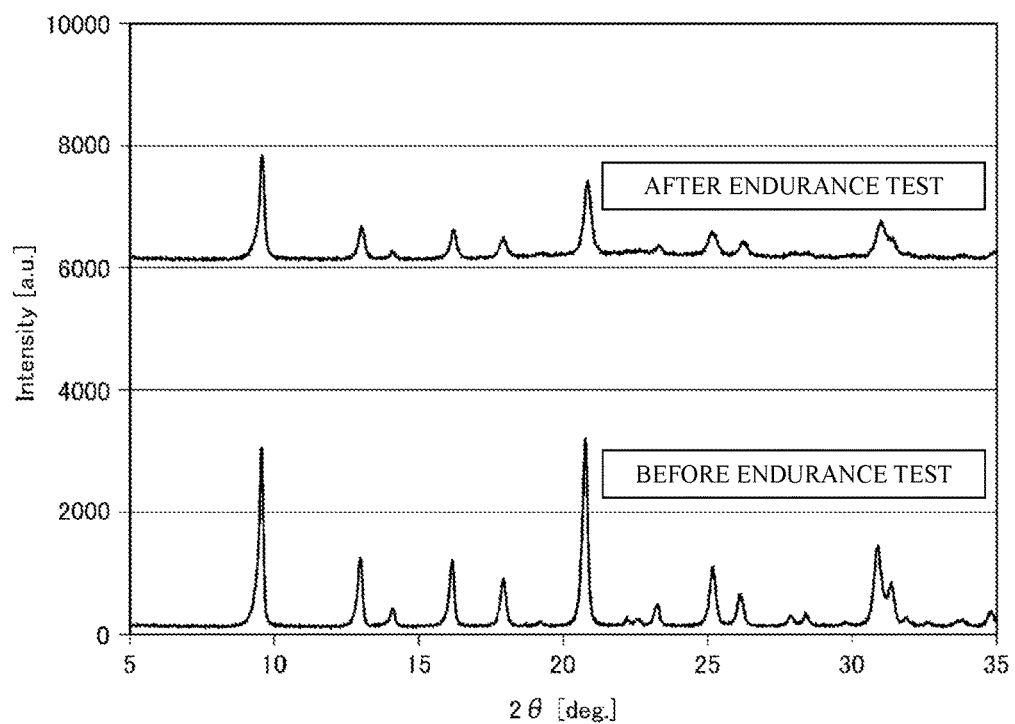
FIG. 7 is a chart illustrating an XRD pattern of zeolite (before and after a heat endurance test) synthesized in Example 1.

In addition, FIG. 6 illustrates an XRD pattern of the zeolite obtained in Comparative Example 1 before and after the heat endurance test, and FIG. 7 illustrates an XRD pattern of the zeolite obtained in Example 1 before and after the heat endurance test.

It was confirmed from FIGS. 6 and 7 that the zeolite synthesized in each of Example 1 and Comparative Example 1 was zeolite having a CHA structure.

<Production of Honeycomb Catalyst>

A raw material paste was prepared by mixing and kneading the zeolite (40% by mass) obtained in each of Examples 1 and 2 and Comparative Examples 1 to 3, pseudo-boehmite (8% by mass) as an inorganic binder, glass fibers (7% by mass) having an average fiber length of 100 μm, methyl cellulose (6.5% by mass), a surfactant (3.5% by mass), and ion exchange water (35% by mass).

The raw material paste was extrusion-molded by an extrusion molding machine to prepare a honeycomb molded body. The honeycomb molded body was dried using a reduced-pressure microwave dryer with an output of 4.5 kW at a reduced pressure of 6.7 kPa for 7 minutes, and then degreased by firing at an oxygen concentration of 1% at 700° C. for 5 hours, thereby producing a honeycomb catalyst (honeycomb unit). The honeycomb unit had a right rectangular pillar-shape having a side of 35 mm and a length of 150 mm, wherein the through-hole density was 124 pcs/cm2 and the thickness of the partition wall was 0.20 mm.

<Measurement of NOx Purification Rate>

Round pillar-shaped test samples having a diameter of 25.4 mm and a length of 38.1 mm were cut out from the honeycomb unit with a diamond cutter. Through the samples, simulation gas at 525° C. was flowed at a space velocity (SV) of 100000/hr, and the amount of NOx flowing out of the test samples was measured with a catalyst analyzer (SIGU-2000/MEXA-6000FT, manufactured by Horiba Ltd.). The NOx purification rate (%) represented by the following formula (1) was calculated. The simulation gas contained 315 ppm of nitrogen monoxide, 35 ppm of nitrogen dioxide, 385 ppm of ammonia, 10% of oxygen, 5% of carbon dioxide, 5% of water, and nitrogen (balance).

Purification rate (%)=(Flow-in amount of NOx− Flow-out amount of NOx)/(Flow-in amount of NOx)×100 (1)

<Calculation of Ammonia Oxidation Rate>

In the measurement of the NOx purification rate, an ammonia oxidation rate (%) represented by the following formula (2) was calculated.

Oxidation rate (%)=(Flow-in amount of ammonia− Flow-out amount of ammonia)/(Flow-in amount of ammonia)×100 (2)

The above results are summarized in Table 1.

TABLE 1

| | Characteristics of zeolite | | | | | | | Evaluation on honeycomb catalyst (initial state) | |
|---|---|---|---|---|---|---|---|---|---|
| | Cu/Al molar ratio | Ce/Al molar ratio | Amount of Ce to be carried (wt %) | Total integrated intensity (initial state) | Total integrated intensity (after heat endurance) | average particle size (m) | SAR | NOx purification rate (%) | Ammonia oxidation rate |
| Comparative Example 1 | 0.37 | — | 0 | 61758 | 18416 | 0.49 | 12.4 | 95.2 | 78 |
| Example 1 | 0.34 | 0.01 | 0.36 | 57948 | 31410 | 0.49 | 12.4 | 93 | 89 |
| Example 2 | 0.32 | 0.03 | 1.09 | 58362 | 31569 | 0.49 | 12.4 | 84 | 92 |
| Comparative Example 2 | 0.30 | 0.04 | 1.45 | 57835 | 31378 | 0.49 | 12.4 | 77 | 98 |
| Comparative Example 3 | 0.23 | 0.01 | 0.36 | 58213 | 31571 | 0.49 | 12.4 | 75 | 10 |

From the results in Table 1, since the zeolite obtained in each of Examples 1 and 2 satisfies the range of the Cu/Al molar ratio and the Ce/Al molar ratio defined in the present invention, the NOx purification rate at 525° C. was high and the ammonia oxidation rate could be kept low in the honeycomb catalyst prepared using the zeolite obtained in each of Examples 1 and 2. In addition, since the total integrated intensity after heat endurance has not decreased so much with respect to the initial state, the crystal structure was maintained well even after the heat endurance. Therefore, it was inferred that the NOx purifying performance after the heat endurance was excellent.

On the other hand, since the zeolite obtained in Comparative Example 1 is not ion-exchanged with Ce, the honeycomb catalyst prepared using such zeolite is high in the initial NOx purification rate at 525° C., but the total integrated intensity after the heat endurance is significantly reduced from the initial stage. Therefore, it was inferred that the NOx purifying performance after the heat endurance was inferior.

Further, since the zeolite obtained in Comparative Example 2 has the Ce/Al molar ratio exceeding the upper limit specified in the present invention, the oxidation rate of ammonia acting as a reducing agent for NOx at 525° C. was high and the NOx purification rate was low. Since the zeolite obtained in Comparative Example 3 has the Cu/Al molar ratio not satisfying the lower limit specified in the present invention, the initial NOx purification rate was low.

Although the present invention has been described in detail and with reference to specific embodiments, it will be apparent to those skilled in the art that various changes and modifications can be made without departing from the spirit and scope of the invention. This application is based upon and claims the benefit of priority from Japanese Patent Application No. 2015-098376, filed May 13, 2015, the entire contents of which are incorporated herein by reference.

LIST OF REFERENCE NUMERALS 10, 10': honeycomb catalyst
11, 11': honeycomb unit
11a: through hole
11b: partition wall
12: outer peripheral coat layer
13: adhesive layer
20: holding sealing material
30: metallic container
100: exhaust gas purifying apparatus
G: exhaust gas

The invention claimed is:
1. Zeolite having a CHA structure in which Cu and Ce are carried,
wherein a Cu/Al molar ratio is 0.25 to 0.48, and
wherein a Ce/Al molar ratio is 0.01 to 0.03.
2. The zeolite according to claim 1,
wherein a $SiO_2/Al_2O_3$ composition ratio (SAR) is less than 15.
3. The zeolite according to claim 1,
wherein an average particle size is 0.5 μm or less.
4. The zeolite according to claim 1,
wherein the zeolite having the CHA structure has a total integrated intensity of a (211) plane, a (104) plane, and a (220) plane in an X-ray diffraction spectrum obtained by an X-ray powder diffraction method being 55000 or more.
5. A method for producing the zeolite according to claim 1, the method comprising:
synthesizing the zeolite by reacting a raw material composition including a Si source, an Al source, an alkali source, water, and a structure directing agent.
6. The method for producing the zeolite according to claim 5,
wherein the Al source is dried aluminum hydroxide gel.
7. The method for producing the zeolite according to claim 5,
wherein a molar ratio ($SiO_2/Al_2O_3$) of the Si source and the Al source contained in the raw material composition is 10 to 15.
8. A honeycomb catalyst comprising:
a honeycomb unit having a plurality of through holes extending in parallel in a longitudinal direction and separated from one another by partition walls,
wherein the honeycomb unit includes an inorganic binder and the zeolite according to claim 1.
9. An exhaust gas purifying apparatus comprising:
the honeycomb catalyst according to claim 8;
a holding sealing material arranged on an outer peripheral portion of the honeycomb catalyst; and
a metallic container into which the holding sealing material is canned.

* * * * *